Patented Jan. 6, 1931

1,788,314

UNITED STATES PATENT OFFICE

BERTRAM MAYER, OF BASEL, AND JACOB WÜRGLER, OF NEUEWELT, NEAR BASEL, SWITZERLAND, ASSIGNORS TO SOCIETY OF CHEMICAL INDUSTRY IN BASLE, OF BASEL, SWITZERLAND

AZO-DYESTUFF OF THE ANTHRAQUINONE SERIES

No Drawing. Application filed March 27, 1929, Serial No. 350,437, and in Switzerland April 4, 1928.

The present invention relates to the manufacture of new azo-dyestuffs of the anthraquinone series particularly suitable for the dyeing of esters and ethers of the cellulose. It comprises the new products, the method of making same, and the material dyed with the new dyestuffs.

It has been found that new dyestuffs are obtained by diazotizing a compound of the general formlua

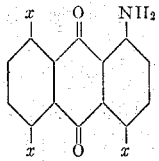

in which $x$ is in two cases hydrogen and in the third an NH-alkyl group or a group capable of being converted into an $NH_2$-group, such as the $NO_2$ or NH-acidyl group, and then coupling with an unsulfonated coupling component and, if necessary, transforming the group capable of being converted into an $NH_2$ group, into an $NH_2$ group, which can for instance be carried out by reduction or saponification. The dyestuffs thus produced correspond with the general formula

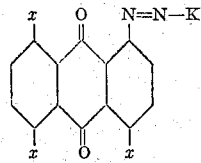

in which K is an unsulfonated residue of any coupling component and $x$ in two cases hydrogen and in the third NHR (R=hydrogen or alkyl).

The new dyestuffs are intensely colored powders insoluble in water and which dissolve in concentrated sulfuric acid to characteristic solutions the color of which may vary from green-olive via yellow, yellow-brown to red-brown and red-violet. They are valuable for producing fast tints on cellulose derivatives, such as cellulose esters or ethers, whether applied to these in the form of textiles (acetate silk or the like) or of artificial masses (celluloid, Zapon lacquers or the like). The shades of these tints are orange to red, violet or brown.

For dyeing textiles it is advantageous to treat the dyestuff before dyeing with a suitable dispersing agent so as to bring it into the form of paste. Such paste may also be converted into solid preparations by cautious evaporation.

As coupling components there come into question all the usual unsulfonated coupling components, such as inter alia compounds which have a methylene group capable of reaction, such as derivatives of the aceto-acetic acid (for example pyrazolones); phenols, such as phenol, cresols, resorcinol, or the like; naphthols, such as $\alpha$- and $\beta$-naphthol; amines, such as dialkyl-anilines, meta-phenylenediamine, meta-toluylenediamine, $\alpha$- and $\beta$-naphthylamines, N-alkyl derivatives thereof, and the like.

Particularly valuable are the red to violet dyestuffs in which K is the residue of a so-called yellow component, such as a pyrazolone, a phenol, a cresol and resorcinol, and in which the $x$ standing in the 5- and 8-position are hydrogen and the $x$ in the 4-position is an $NH_2$ group.

The following examples illustrate the invention, the parts being by weight:—

Example 1

12,1 parts of 1-amino-4-methylaminoanthraquinone are suspended in 100 parts of sulfuric acid of 10 per cent. strength, and there are added gradually at room temperature an aqueous solution of 3,4 parts of sodium nitrite. Stirring is continued until the nitrous acid has disappeared. The diazo-solution thus obtained is then introduced into a solution of 6,2 parts of meta-toluylenediamine in 180 parts of water, 14 parts of sodium acetate being present in the solution. The insoluble new azo-dyestuff of the probable formula

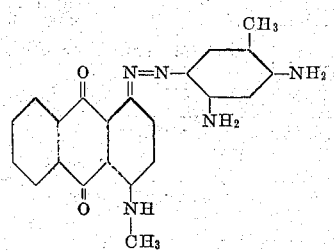

thus formed is filtered, washed neutral and dried or directly converted into a paste.

*Example 2*

13.5 parts of 1:8-aminonitroanthraquinone are dissolved in 135 parts of sulfuric acid monohydrate and the solution is mixed at a temperature below 20° C. with 3,6 parts of sodium nitrite and stirred at room temperature until the nitrous acid has disappeared, or is present only in traces. The whole is then poured upon 400 parts of ice, the diazobody which separates is filtered by suction and introduced into an aqueous solution of 6 parts of resorcinol containing excess of sodium carbonate. The coupling is quickly completed.

The new dyestuff is precipitated in the form of orange, insoluble flocks; these are filtered and washed.

The dyestuff thus obtained is introduced while stirring well into a solution of 6 parts of sodium hydrosulfide in 200 parts of water and stirring is continued for about ½ hour to 1 hour at 50–60° C., whereby the nitrogroup is reduced. The separated amino-azo-dyestuff of the probable formula

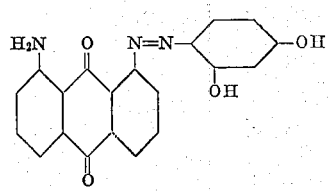

is filtered, washed neutral and dried or made into a paste.

The procedure is similar with other anthraquinone derivatives and coupling components. The properties of a series of dyestuffs which can be obtained in this manner are set forth in the table below.

*Example 3*

15 parts of the product of the reduced dyestuff of Example 2 (best in the form of a freshly made press-cake) are stirred in known manner with sulfite cellulose waste liquor or with a sulfonation product of the distillation residue from benzaldehyde or turpentine oil, so as to form a uniform paste of 20 per cent. strength.

5 parts of this paste are stirred with about the same quantity of a soap solution of 6 per cent. strength at about 50° C. and diluted to form 300 parts with lukewarm water. 10 parts of acetate silk are entered into this bath which is then heated within ¾ hour to 75–80° C.; the goods are handled at this temperature for about ¾ hour. They are then rinsed and dried. The acetate silk is dyed beautiful reddish orange tints.

*Example 4*

4 to 5 parts of the reduced dyestuff from 1:4-aminonitroanthraquinone and resorcinol are dissolved in 1000 parts of finished Zapon lacquer. The liquid thus obtained is spread as a thin coating on various supports (metal, glass, leather, wood, celluloid, silk or the like), whereupon the liquid dries, leaving a transparent coating of beautiful violet colour. By incorporating suitable additions in the lacquer, the latter may be caused to produce a mat or opaque coating.

| | Diazotized-component | Coupling-component | Properties of the azo-dyestuff (in some cases after reduction or saponification) | | |
|---|---|---|---|---|---|
| | | | Color of powder | Color of solution in concentrated $H_2SO_4$ | Color tint obtained on acetate silk |
| I | 1:4-amino-nitroanthraquinone. | Resorcinol | Black-violet | Brownish-scarlet | Pure violet. |
| II | ......do...... | m-toluylene-diamine | Brown-violet | Orange-brown | Reddish violet. |
| III | ......do...... | 1-naphthylamine | Violet | Olive-green | Violet. |
| IV | ......do...... | 2-naphthol | ......do...... | Olive-brown | Reddish-violet. |
| V | ......do...... | Phenyl-methyl-pyrazolone | ......do...... | Orange-brown | Red-violet. |
| VI | 1:5-aminonitroanthraquinone. | Resorcinol | Brown-orange | Deep-orange | Reddish-orange. |
| VII | ......do...... | Meta-toluylene-diamine | Red-orange | Yellow | Reddish-orange. |
| VIII | ......do...... | Diethylaniline | Brown-red | Brown-orange | Brown-orange. |
| IX | 1:8-aminonitroanthraquinone. | Resorcinol | Red | Yellow | Orange red. |
| X | ......do...... | Meta-toluylene-diamine | Red | Light-yellow | Orange red. |
| XI | ......do...... | 2-naphthol | Orange-red | Violet-red | Orange red. |
| XII | ......do...... | Phenylmethyl-pyrazolone | ......do...... | Yellow | Orange red. |
| XIII | ......do...... | Diethylaniline | ......do...... | Yellow-brown | Orange red. |
| XIV | 1-amino-2-methyl-4-nitroanthraquinone. | Resorcinol | Violet-black | Yellow-brown | Reddish-violet. |
| XV | ......do...... | Meta-toluylene-diamine | ......do...... | ......do...... | Currant. |
| XVI | ......do...... | Phenylmethyl-pyrazolone | ......do...... | ......do...... | Violet. |
| XVII | 1-amino-4-methyl-amino-anthraquinone. | Meta-toluylene-diamine | Brown-black | Salmon-red | Violet-brown. |
| XVIII | ......do...... | 1-naphthylamine | Violet-brown | Dull-violet | Reddish-brown. |
| XIX | 1-amino-4-cyclohexylaminoanthraquinone. | Phenylmethyl-pyrazolone | Blackish | Red-violet | Brown. |

The formula of the dyestuff I is very probably:

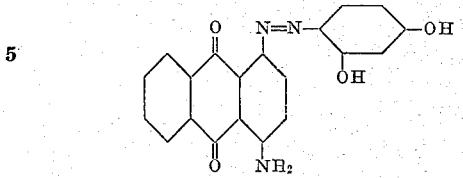

The formula of the dyestuff III is very probably:

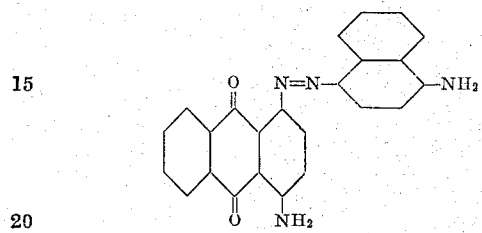

The formula of the dyestuff XIV is very probably:

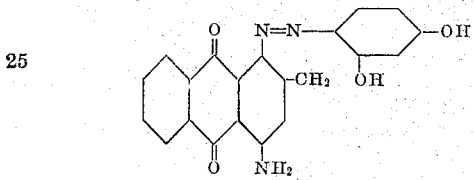

The formula of the dyestuff XIX is very probably:

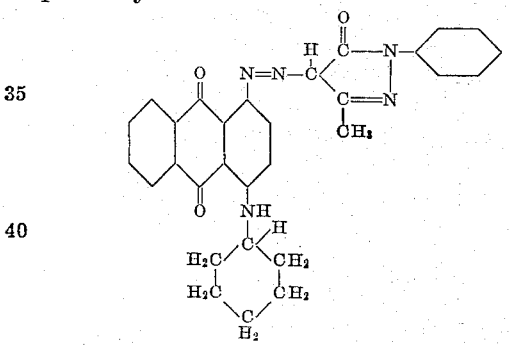

What we claim is:
1. As new products the unsulfonated azo-dyestuffs of the general formula

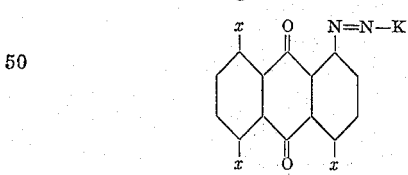

in which K stands for a residue of any coupling component and $x$ in two cases for hydrogen and in the third for

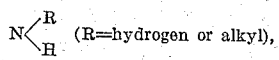

which products form intensely colored powders which dissolve in concentrated sulfuric acid with colorations the tints of which may vary from green-olive via yellow, yellow-brown to red-brown and red-violet, and which dye acetate silk orange to red, violet and brown tints.

2. As new products the unsulfonated azo-dyestuffs of the general formula

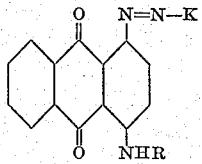

in which K stands for a residue of any coupling component and R for hydrogen or alkyl, which products form intensely colored powders which dissolve in concentrated sulfuric acid with colorations the tints of which may vary from green-olive via yellow, yellow-brown to red-brown and red-violet, and which dye acetate silk orange to red, violet and brown tints.

3. As new products the unsulfonated azo-dyestuffs of the general formula

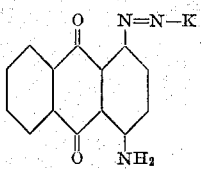

in which K is a residue of a so-called yellow-component, which products form dark violet powders dissolving in concentrated sulfuric acid with red-brown to orange-brown coloration, and dyeing acetate silk red to violet tints.

4. As a new product the azo-dyestuffs of the probable formula

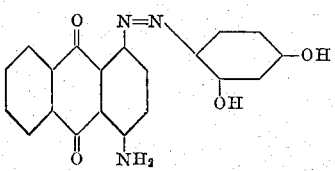

forming a violet-black powder, dissolving in concentrated sulfuric acid to a brownish-scarlet solution, and dyeing acetate silk pure violet tints.

5. The materials dyed with the dyestuffs of claim 1.

6. The materials dyed with the dyestuffs of claim 2.

7. The materials dyed with the dyestuffs of claim 3.

8. The materials dyed with the dyestuffs of claim 4.

In witness whereof we have hereunto signed our names this 12th day of March, 1929.

BERTRAM MAYER.
JACOB WÜRGLER.